United States Patent
Yetukuri et al.

(10) Patent No.: US 10,906,439 B2
(45) Date of Patent: Feb. 2, 2021

(54) SEAT ASSEMBLY ACTUATABLE FOR POTENTIAL VEHICLE IMPACT

(71) Applicant: Lear Corporation, Southfield, MI (US)

(72) Inventors: Arjun Yetukuri, Rochester Hills, MI (US); Karl Henn, New Hudson, MI (US)

(73) Assignee: Lear Corporation, Southfield, MI (US)

( * ) Notice: Subject to any disclaimer, the term of this patent is extended or adjusted under 35 U.S.C. 154(b) by 134 days.

(21) Appl. No.: 16/206,416

(22) Filed: Nov. 30, 2018

(65) Prior Publication Data

US 2020/0171985 A1   Jun. 4, 2020

(51) Int. Cl.
*B60N 2/427*   (2006.01)
*B60N 2/42*   (2006.01)
*B60R 21/0132*   (2006.01)
*B60R 21/00*   (2006.01)
*B60N 2/02*   (2006.01)

(52) U.S. Cl.
CPC ......... *B60N 2/4279* (2013.01); *B60N 2/4221* (2013.01); *B60N 2/0296* (2013.01); *B60R 21/0132* (2013.01); *B60R 2021/0004* (2013.01)

(58) Field of Classification Search
CPC .. B60N 2/4279; B60N 2/4221; B60N 2/0296; B60R 21/0132; B60R 2021/0004
See application file for complete search history.

(56) References Cited

U.S. PATENT DOCUMENTS

| | | | |
|---|---|---|---|
| 6,334,648 | B1 | 1/2002 | Girsberger et al. |
| 8,630,772 | B2 | 1/2014 | Ieda et al. |
| 2017/0291511 | A1 | 10/2017 | Akaike et al. |
| 2018/0170215 | A1 | 6/2018 | Yetukuri et al. |

*Primary Examiner* — D Glenn Dayoan
*Assistant Examiner* — Melissa Ann Bonifazi
(74) *Attorney, Agent, or Firm* — Brooks Kushman P.C.

(57) ABSTRACT

A vehicle seat assembly is provided with a seat bottom that is adapted to be mounted to a vehicle floor. A seatback is adapted to be pivotally mounted adjacent to the seat bottom. An actuator is in cooperation with the seat bottom or the seatback. A controller is in electrical communication with the actuator and programmed to receive input indicative of a potential vehicle impact. In response to receiving the input indicative of the potential vehicle impact, the controller outputs a signal to the actuator to tilt the seatback, or to tilt the seat bottom.

19 Claims, 4 Drawing Sheets

SEAT ASSEMBLY ACTUATABLE FOR POTENTIAL VEHICLE IMPACT

TECHNICAL FIELD

Various embodiments relate to seat assemblies that are actuated in response to a potential vehicle impact.

BACKGROUND

In 2015, 33.4 percent of all police-reported crashes involved a rear-end collision with another vehicle. Collision Warning Systems (CWS) alert a driver of such a collision, when a potential or an imminent crash is detected. If the warning system detects that the occupant is not responding or not responding with adequate braking or will not be able to respond in time, an automatic emergency braking (AEB) system either supplements driver's braking or automatically applies brakes to slow or stop the car.

SUMMARY

According to at least one embodiment, a vehicle seat assembly is provided with a seat bottom that is adapted to be mounted to a vehicle floor. A seatback is adapted to be pivotally mounted adjacent to the seat bottom. An actuator is in cooperation with the seat bottom or the seatback. A controller is in electrical communication with the actuator and programmed to receive input indicative of a potential vehicle impact. In response to receiving the input indicative of the potential vehicle impact, the controller outputs a signal to the actuator to tilt the seatback, or to tilt the seat bottom.

According to a further embodiment, the controller is further programmed to output a signal to the actuator to tilt the seatback rearward in response to receiving the input indicative of the potential vehicle impact.

According to an even further embodiment, the controller is further programmed to output a signal to the actuator to tilt the seatback rearward by approximately nine degrees in response to receiving the input indicative of the potential vehicle impact.

According to another even further embodiment, the controller is further programmed to output a signal to the actuator to tilt the seat bottom upward in response to receiving the input indicative of the potential vehicle impact.

According to another further embodiment, the controller is further programmed to output a signal to the actuator to tilt the seat bottom upward in response to receiving the input indicative of the potential vehicle impact.

According to an even further embodiment, the controller is further programmed to output a signal to the actuator to tilt the seat bottom upward by approximately ten degrees in response to receiving the input indicative of the potential vehicle impact.

According to another further embodiment, the controller is further programmed to receive input indicative of an avoided vehicle impact and output a signal to the actuator to return the seat bottom or the seatback to a previous seating position in response to receipt of the input indicative of the avoided vehicle impact.

According to another further embodiment, a second actuator is in cooperation with the seat bottom and the vehicle floor to adjust a position of the seat bottom in a fore and aft direction, or in cooperation with a foot pedal to adjust the foot pedal. The controller is further programmed to receive input indicative of a change in contact of the foot pedal and output a signal to the second actuator to move the seat bottom forward or to move the foot pedal.

According to another embodiment, a land vehicle is provided with a vehicle floor and at least one impact sensor. A vehicle controller is in communication with the land vehicle to control travel of the land vehicle, and in communication with the at least one impact sensor to output a signal indicative of a potential vehicle impact. At least one vehicle seat assembly is provided with a seat bottom that is mounted to the vehicle floor. A seatback is adapted to be pivotally mounted adjacent to the seat bottom. An actuator is in cooperation with the seat bottom or the seatback. A controller is in electrical communication with the vehicle controller and the actuator and is programmed to receive input indicative of a potential vehicle impact. In response to receiving the input indicative of the potential vehicle impact, the controller outputs a signal to the actuator to tilt the seatback rearward, or to tilt the seat bottom upward.

According to another embodiment, a computer-program product is embodied in a non-transitory computer readable medium that is programmed to automatically adjust a seat assembly. The computer-program product includes instructions to receive input indicative of a potential vehicle impact and output a signal to an actuator in cooperation with a seat bottom or a seatback of the seat assembly to tilt the seatback or to tilt the seat bottom in response to receiving the input indicative of the potential vehicle impact.

According to a further embodiment, the computer-program product includes further instructions to output a signal to the actuator to tilt the seatback rearward in response to receiving the input indicative of the potential vehicle impact.

According to an even further embodiment, the computer-program product includes further instructions to output a signal to the actuator to tilt the seatback rearward by approximately nine degrees in response to receiving the input indicative of the potential vehicle impact.

According to another even further embodiment, the computer-program product includes further instructions to output a signal to the actuator to tilt the seat bottom upward in response to receiving the input indicative of the potential vehicle impact.

According to another further embodiment, the computer-program product includes further instructions to output a signal to the actuator to tilt the seat bottom upward in response to receiving the input indicative of the potential vehicle impact.

According to an even further embodiment, the computer-program product includes further instructions to output a signal to the actuator to tilt the seat bottom upward by approximately ten degrees in response to receiving the input indicative of the potential vehicle impact.

According to another further embodiment, the computer-program product includes further instructions to receive input indicative of an avoided vehicle impact and output a signal to the actuator to return the seat bottom or the seatback to a previous seating position in response to receipt of the input indicative of the avoided vehicle impact.

According to another further embodiment, the computer-program product includes further instructions to receive input indicative of a change in contact of a foot pedal and output a signal to a second actuator to move the seat bottom forward or to move the foot pedal.

According to another embodiment, a vehicle seat assembly is provided with a seat bottom adapted to be mounted to a vehicle floor. A seatback is adapted to be pivotally mounted adjacent to the seat bottom. A first actuator is in cooperation with the seatback. A second actuator is in cooperation with the seat bottom. A controller is in electrical communication with the first actuator and the second actuator and is programmed to receive input indicative of a potential vehicle impact. In response to receiving the input indicative of the potential vehicle impact, a signal is output to the first actuator to tilt the seatback rearward by approximately nine degrees. In response to receiving the input indicative of the potential vehicle impact, a signal is output to the second actuator to tilt the seat bottom upward by approximately ten degrees. Input indicative of an avoided vehicle impact is received. A signal is output to the first actuator to return the seatback to a previous seating position in response to receipt of the input indicative of the avoided vehicle impact. A signal is output to the second actuator to return the seat bottom to the previous seating position in response to receipt of the input indicative of the avoided vehicle impact.

According to a further embodiment, a second actuator is in cooperation with the seat bottom and the vehicle floor to adjust a position of the seat bottom in a fore and aft direction, or in cooperation with a foot pedal to adjust the foot pedal. The controller is further programmed to receive input indicative of a change in contact of a foot pedal and to output a signal to the second actuator to move the seat bottom forward or to move the foot pedal.

According to another embodiment, a land vehicle is provided with a vehicle floor and at least one impact sensor. A vehicle controller is in communication with the land vehicle to control travel of the land vehicle, and in communication with the at least one impact sensor to output a signal indicative of a potential vehicle impact. At least one vehicle seat assembly is provided with a seat bottom mounted to the vehicle floor. A seatback is adapted to be pivotally mounted adjacent to the seat bottom. A first actuator is in cooperation with the seatback. A second actuator is in cooperation with the seat bottom. A controller is in electrical communication with the first actuator and the second actuator and the vehicle controller and is programmed to receive input indicative of a potential vehicle impact. In response to receiving the input indicative of the potential vehicle impact, a signal is output to the first actuator to tilt the seatback rearward by approximately nine degrees. In response to receiving the input indicative of the potential vehicle impact, a signal is output to the second actuator to tilt the seat bottom upward by approximately ten degrees. Input indicative of an avoided vehicle impact is received. A signal is output to the first actuator to return the seatback to a previous seating position in response to receipt of the input indicative of the avoided vehicle impact. A signal is output to the second actuator to return the seat bottom to the previous seating position in response to receipt of the input indicative of the avoided vehicle impact.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Collision Warning Systems (CWS) have been utilized in the prior art to alert the driver when a potential or an imminent rear-end collision is detected. Under certain conditions, the CWS may initiate the automatic emergency braking (AEB) system to supplement the braking applied by the driver or to automatically apply brakes to slow or stop the car. However, rapid deceleration caused by the AEB could change the occupant's relationship to an airbag that is deployed in front of the occupant in the event of a crash eventually occurring.

Figure 1:
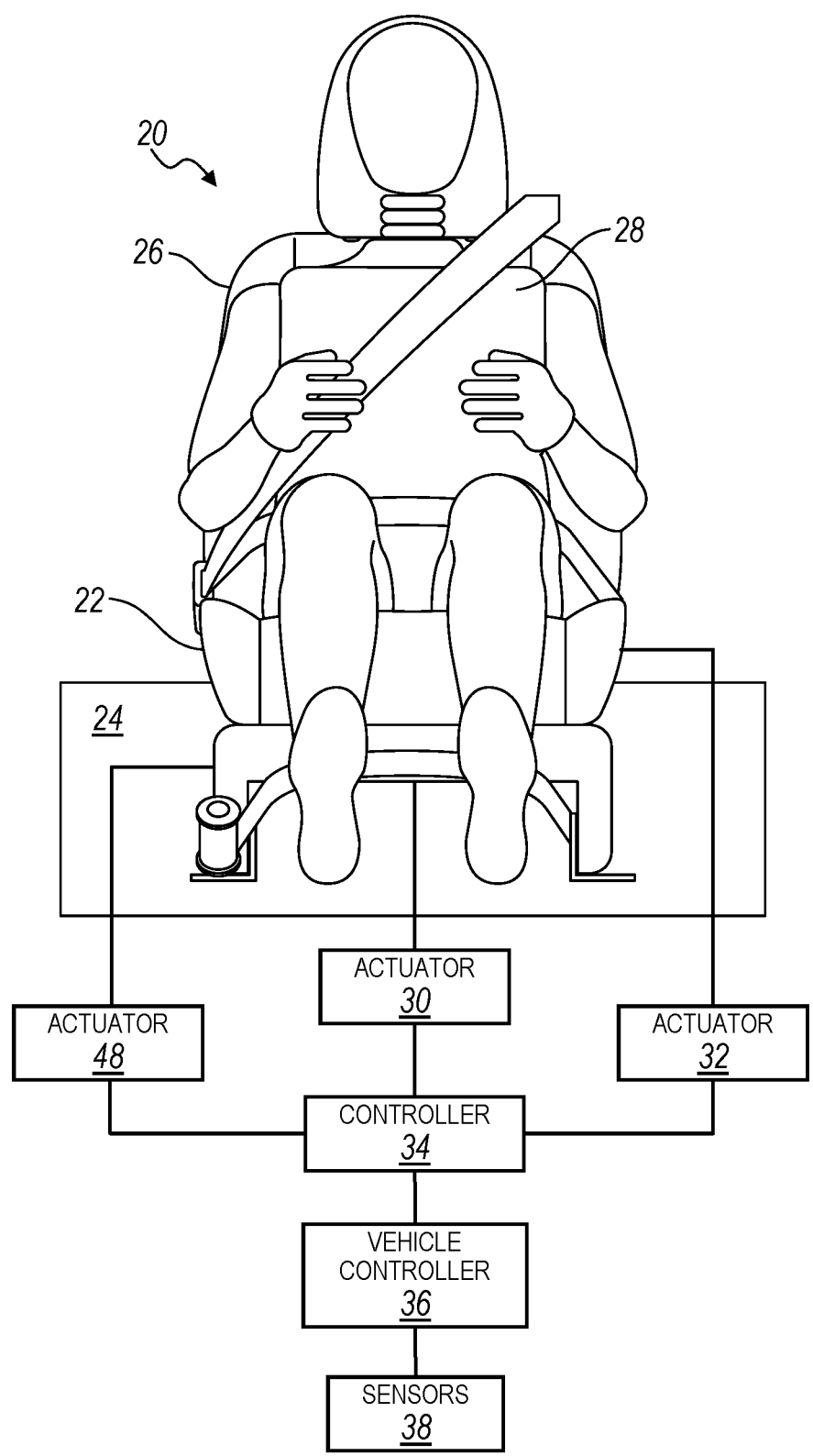
FIG. 1 is a front perspective view of a seat assembly illustrated schematically in a seating position in a vehicle environment according to an embodiment.

Referring now to FIG. 1, a seat assembly 20 is illustrated, which employs an Occupant Pre-position System (OPS) to pre-position the occupant relative to an airbag in a potential or imminent impact condition. For example, when the OPS may pre-position the occupant by rapidly tilting an occupant. The occupant may be tilted by an automated tilting of the seat assembly 20, or by actuating one or more components of the seat assembly 20.

The seat assembly 20 includes a seat bottom or cushion 22 that is connected to a vehicle floor 24. A seatback 26 extends at an angle from the seat cushion 22 to support a back of a seated occupant 28. The seat assembly 20 includes a seat cushion tilt actuator 30 in cooperation with the seat cushion 22 and the vehicle floor 24 to tilt at least a portion of the seat cushion 22 relative to the vehicle floor 24. The seat assembly 20 also includes a seatback tilt actuator 32 in cooperation with the seat cushion 22 and the seatback 26 to tilt the seatback 26 relative to the seat cushion 22. The tilt actuators 30, 32 may be motor-driven actuators with gear-trains as known in the art.

A controller 34 is in electrical communication with the seat cushion tilt actuator 30 and the seatback tilt actuator 32 to control the operation of the actuators 30, 32. The controller 34 may be a module within a vehicle controller 36. Alternatively, the controller 34 may be disposed within or under the vehicle seat assembly 20. The methodology of the controller 34 may be stored on a physical module or may be stored on any computer-program product that may be embodied in a non-transitory readable medium that is programmed to automatically adjust the seat assembly 20.

The controller 34 may operate to tilt the seat cushion 22 and or the seatback 26 of the seat assembly 20 in response to operator instructions through a user interface. Alternatively, the seat assembly 20 may permit manual adjustments, whereby the actuators 30, 32 only pivot the seat assembly 20 under predefined conditions set forth in the controller 34.

The seat controller 34 is in communication with the vehicle controller 36. The vehicle controller 36 is in communication with various vehicle safety features, including impact sensors 38. The vehicle controller 36 receives input from the impact sensors 38 that indicate that a vehicle impact is potentially imminent. This information is communicated to the vehicle seat assembly controller 34. The seat assembly controller 34 processes the impact information in order to control the actuators 30, 32 and adjust the seat assembly 20 to a predefined seat orientation depending upon the impact condition. For example, if a potential rear impact condition is detected, the seat assembly controller 34 may adjust the actuators 30, 32 to tilt the seatback 26 rearward and/or tilt at least a portion of the seat cushion 22 upward.

Figure 2:
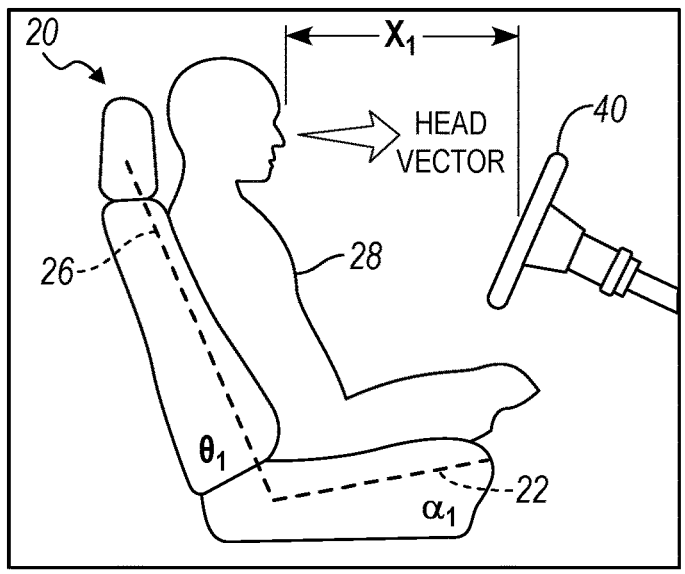
FIG. 2 is a side elevation schematic view of an occupant in the seat assembly of FIG. 1, illustrated at an initial time prior to an impact condition.

FIG. 2 schematically illustrates the seat assembly 20 in a pre-AEB occupant pre-position, with a time $t_1$ of zero seconds, and a velocity V of an associated land vehicle of thirty miles per hour (MPH). In this position, the seat cushion 22 is in an initial position, with a tilt angle $\alpha_1$ of the seat cushion 22 of zero degrees relative to the initial position. Likewise, the seatback 26 is oriented at an initial position, whereby a tilt angle $\Theta_1$ of the seatback 26 is zero degrees relative to the initial position. In the initial position, a head vector of the occupant 28 is generally horizontal, and the head of the occupant is spaced an initial distance $x_1$ from a housing of an undeployed airbag, such as a steering wheel 40. In the depicted example, the spacing distance $x_1$ from the airbag housing 40 to the head of the occupant 28 is 425 millimeters (mm).

Figure 3:
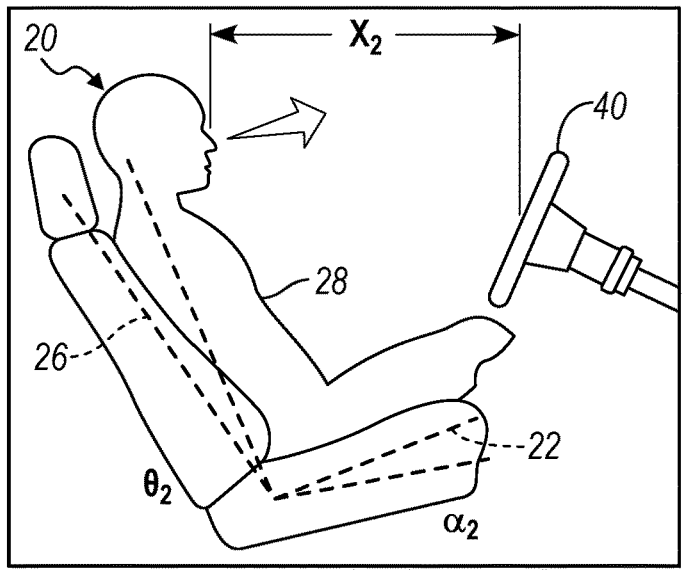
FIG. 3 is another side elevation schematic view of the occupant in the seat assembly of FIG. 1, illustrated at an intermediate time prior to an impact condition.

At time $t_1$, a potential impact is detected by the sensors 38, which is communicated to the vehicle controller 36, and the seat assembly controller 34. The seat assembly controller 34 operates the actuators 30, 32. FIG. 3 illustrates the seat assembly 20 in the occupant pre-position after a rapid seatback 26 rearward tilt and a rapid cushion 22 upward tilt. The time $t_2$ is 800 milliseconds (ms), and the velocity V of the vehicle is still thirty MPH. In this position, the seat cushion 22 is actuated, with the tilt angle $\alpha_2$ of the seat cushion 22 increased from the initial position. One suitable example for the increase of the tilt angle $\alpha_2$ is ten degrees, or approximately ten degrees, which is within a couple degrees of the target ten degrees. Although an increased tilt angle $\alpha_2$ of ten degrees is illustrated and described, any suitable tilt angle $\alpha_2$ increase may be employed. The entire seat cushion 22 is illustrated tilted relative to the initial tilt angle $\alpha_1$. However, a portion of the seat cushion 22 may be actuated to provide the tilt, such as a front portion of the seat cushion 22.

FIG. 3 illustrates the seatback 26 oriented a tilt angle $\Theta_2$ of the seatback 26 at nine degrees relative to the initial position. In this intermediate position, the head vector of the occupant 28 is increased above horizontal, and the head of the occupant is spaced further apart at distance $x_2$ from the airbag housing 40. Although an increased tilt angle $\Theta_2$ of nine degrees is illustrated and described, any suitable tilt angle $\Theta_2$ increase is contemplated, or approximately nine degrees, which is within a couple degrees of the target nine degrees. Although the seat assembly 20 is illustrated with the seat cushion 22 tilted and the seatback 26 tilted, each of these components can be tilted separately.

Figure 4:
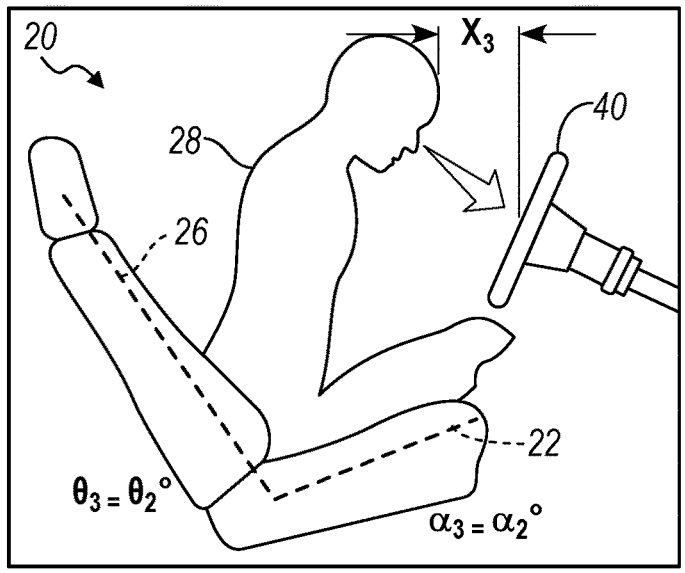
FIG. 4 is another side elevation schematic view of the occupant in the seat assembly of FIG. 1, illustrated during an impact condition.

After time $t_2$, a rear impact is experienced by the vehicle. FIG. 4 illustrates the seat assembly 20 in the occupant pre-position and the occupant in reaction to the impact condition. The time $t_3$ is $t_2$ plus 1200 ms, or 2000 ms; and the velocity V of the vehicle is reduced to zero MPH. In this position, the seat cushion 22 has a tilt angle $\alpha_3$ that is equal to the actuated tilt angle $\alpha_2$ of the seat cushion 22. The seatback 26 is oriented at tilt angle $\Theta_3$ that is equal to the actuated tilt angle $\Theta_2$ of the seatback 26. In this intermediate position, the head vector of the occupant 28 is decreased below horizontal to target the airbag housing 40. The head of the occupant is decreased to distance $x_3$ from the airbag housing 40.

Figure 5:
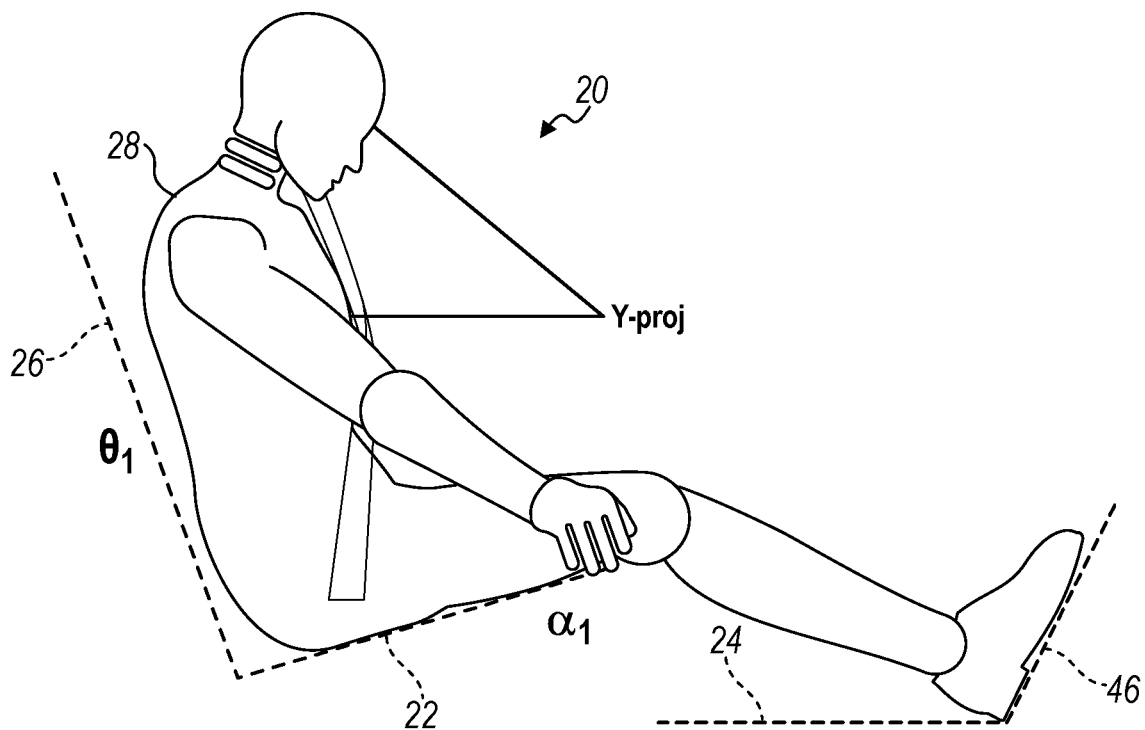
FIG. 5 is a side elevation schematic view of an occupant in the seat assembly of FIG. 1, illustrated during another impact condition.

FIG. 5 illustrates the seat assembly 20 in a frontal impact condition without employing the pre-position system. In this Figure, the time is $t_3$, or 2000 ms after the potential crash is detected, and 1200 ms after a frontal impact. However, the seat cushion 22 and the seatback 26 have not been actuated and are at the initial positions without increased tilt angles $\alpha_1$, $\Theta_1$. In this position, an angle of head of the occupant 28 relative to the airbag housing 40 is labeled as Y-proj and has a value of approximately 40.5 degrees. The 2000 ms timeframe for positioning of the seat assembly 20 for a frontal impact is by way of example. The period between detection $t_1$, actuation $t_2$, and response to impact $t_3$ is commonly within a range of 1800 ms to 2200 ms.

Figure 6:
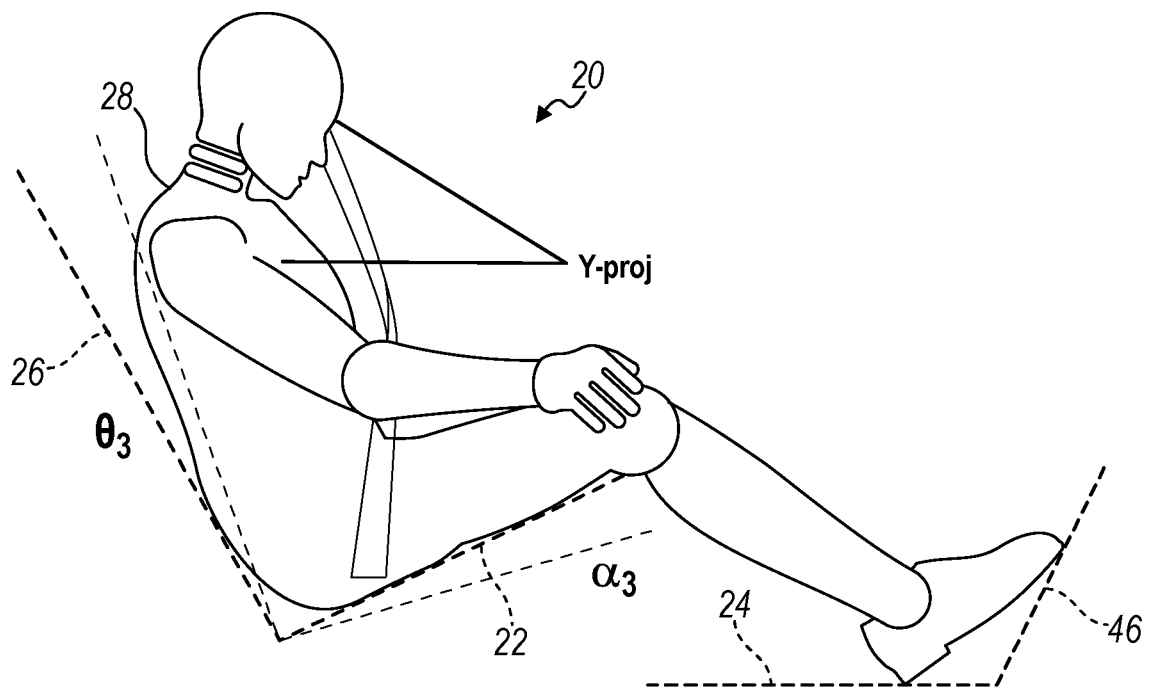
FIG. 6 is a side elevation schematic view of the occupant in the seat assembly of FIG. 1, illustrated during another impact condition.

FIG. 6 illustrates the seat assembly 20 in the frontal impact condition with utilization of the pre-position system. The time is $t_3$, which is 2000 ms after the potential crash is detected, and 1200 ms after the frontal impact. The seat cushion 22 is rapidly tilted to the increased tilt angle $\alpha_3$. The seatback 26 is rapidly tilted to the increased tilt angles, $\Theta_3$. In this position, the angle Y-proj of the head of the occupant 28 relative to the airbag housing 40 has a value of approximately thirty-two degrees. Comparing FIG. 5 of the baseline position of the seat assembly 20 to the pre-position actuated seat of FIG. 6, a difference between the angles of the head vectors is 8.5 degrees less in FIG. 6. Therefore, the pre-position system may be employed to result in lest rotation of the head of the occupant in a frontal impact condition.

Figure 7:
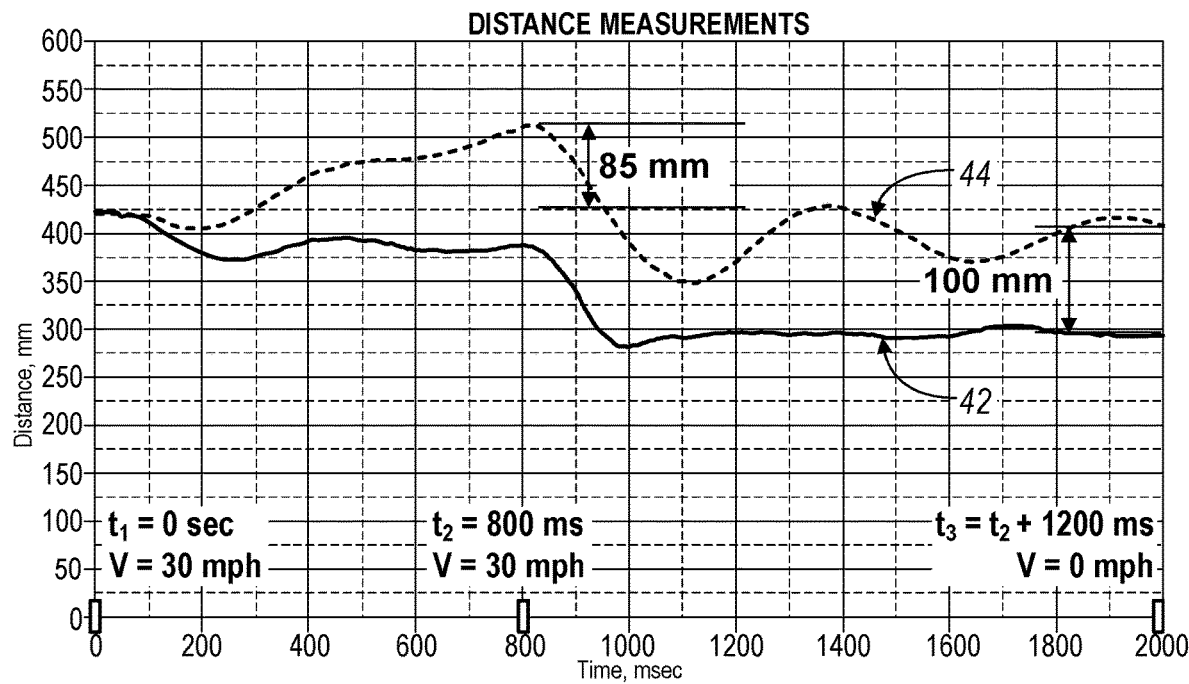
FIG. 7 is a graph of a distance between a head an airbag of the occupants of FIGS. 5 and 6 graphed over time during impact conditions.

FIG. 7 illustrates a graph of distance $x_1$, $x_2$, $x_3$ between the head of the occupant 28 and the airbag 40 location in mm on the ordinate or vertical axis, versus time in ms on the abscissa or horizontal axis. The distance $x_1$, $x_2$, $x_3$ for the baseline seat assembly 20 without actuation is graphed at line 42 with the position at time $t_3$ depicted in FIG. 5. The distance $x_1$, $x_2$, $x_3$ for the seat assembly 20 utilizing OPS is graphed at line 44 with the position at time $t_3$ depicted in FIG. 6.

As illustrated in the graph of FIG. 7, the OPS system of the seat assembly 20 begins by repositioning the seat assembly 20, which consequently moves the head of the occupant 28 an additional eighty-five mm away from the airbag target 40 at time $t_2$. At time $t_3$ the head of the occupant 28 is an additional 100 mm away from the airbag target 40 for the seat assembly 20 utilizing OPS (line 44 in FIG. 7, position depicted in FIG. 6) than the seat assembly 20 with the baseline position (line 42 in FIG. 7, position depicted in FIG. 5). The OPS can be utilized to control a seat assembly 20 to position the head of the occupant 28 at a preferred orientation (vector) and distance relative to the airbag target 40 prior to impact with the airbag.

Referring again to FIG. 6, when the OPS adjusts the seat assembly 20, a foot of the occupant 28 may be moved relative to a brake pedal 46. The vehicle sensors 38 (FIG. 1) may include a sensor 38 in cooperation with the brake pedal 46 to detect a change in contact or a loss of contact between the foot of the occupant 28 and the brake pedal 46. Alternatively, an onboard camera or other suitable detector may be employed to monitor the contact of the foot of the occupant 28 with the brake pedal 46.

Referring again to FIG. 1, the seat assembly 20 may include a linear actuator 48 in cooperation with the seat cushion 22 and the vehicle floor 24 for linear actuation of the seat assembly 20 according to an embodiment. The linear actuator 48 may be utilized for longitudinal adjustment of the seat assembly 20 in a fore and aft direction of the vehicle. In response to detection of a change or loss of contact of the foot of the occupant 28 to the brake pedal 46, the vehicle controller 36 may convey this information to the seat assembly controller 34, which may adjust the actuator 48 to move the seat assembly 20 forward to decrease a distance between the foot of the occupant 28 and the brake pedal 46. This adjustment may improve the manual control of braking of the vehicle by the occupant 28. Alternatively, the pedal 46 can be adjusted accordingly. The interaction of the pedal 46 with the foot may be controlled by the OPS or under a separate controller or system.

With continued reference to FIG. 1, the sensors 38 may also detect if an impact is avoided. If so, the seat assembly controller 34 may return the seat assembly 20 to the initial tilt angles $\alpha_1$, $\Theta_1$.

Figure 8:
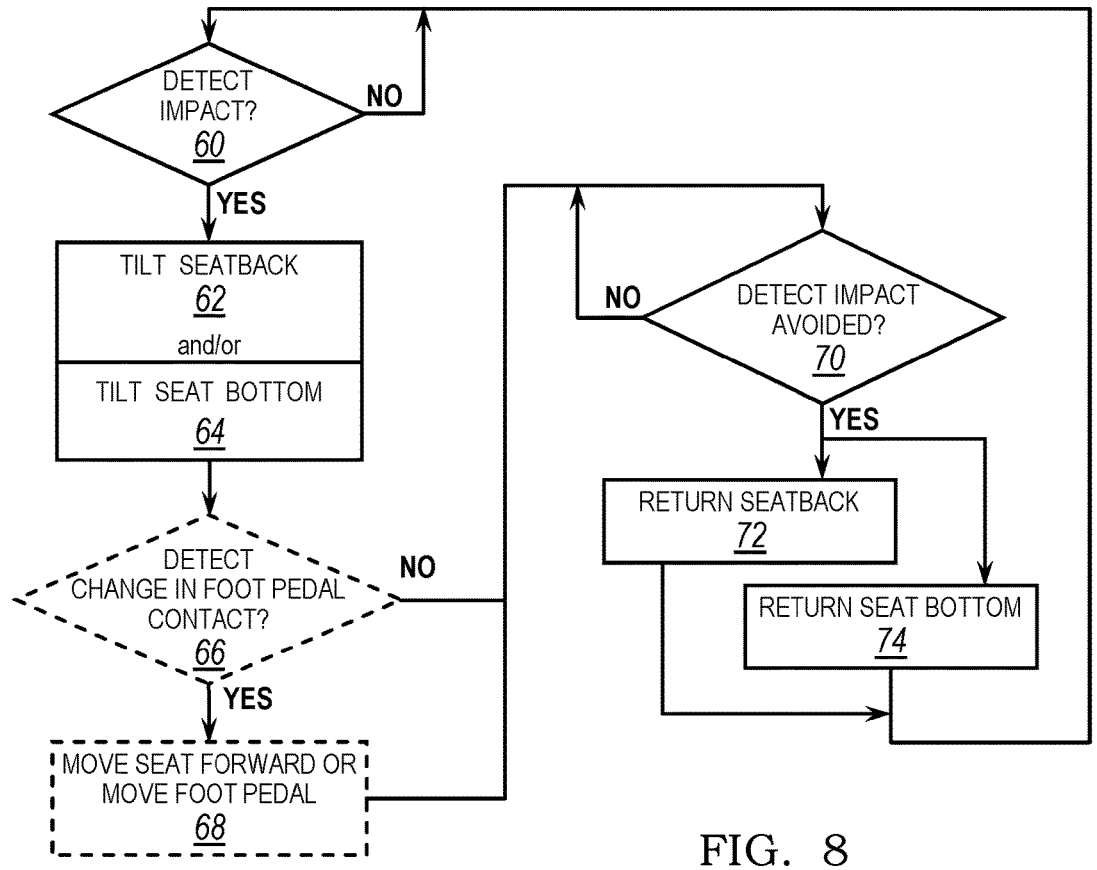
FIG. 8 is a flowchart of a method for adjusting the seat assembly of FIG. 1, according to an embodiment.

FIG. 8 illustrates the OPS method according to an embodiment. At block 60, the sensors 38 detect a potential or imminent impact. In response to the detected potential impact, at block 62, the seat assembly controller 34 operates the recline actuator 32 to tilt the seatback 26 with an increased tilt angle $\alpha_2$. Also, in response, at block 64, the seat assembly controller 34 operates the tilt actuator 30 to tilt the seat cushion 22 with an increased tilt angle $\Theta_2$. If a potential impact is not detected, then block 60 is repeated.

According to one embodiment, at block 62, the seat assembly controller 34 operates the recline actuator 32 to tilt the seatback 26 with the increased tilt angle $\alpha_2$ only. According to another embodiment, at block 64, the seat assembly controller 34 operates the tilt actuator 30 to tilt the seat cushion 22 with the increased tilt angle $\Theta_2$ only. According to another embodiment, both blocks 62 and 64 are performed whereby the seat assembly controller 34 operates the recline actuator 32 to tilt the seatback 26 with the increased tilt angle $\alpha_2$, and the seat assembly controller 34 operates the tilt actuator 30 to tilt the seat cushion 22 with the increased tilt angle $\Theta_2$.

As discussed above, the adjustment based on contact with the foot pedal 46 is an alternative option. Likewise, blocks 66 and 68 are depicted in broken lines. If no adjustment is provided by the OPS, then blocks 66 and 68 are skipped and the OPS proceeds to block 70.

For the depicted embodiment, at block 66, the sensors 38 detect if there is a change in contact with the occupant 28 and the brake pedal 46. If so, the seat assembly 20 is moved forward by the actuator 48 by the seat assembly controller 34 at block 68. Alternatively, the pedal 46 is adjusted toward the seat assembly 20. Then the method proceeds to decision block 70. If a change in foot pedal contact is not detected at block 66, then at decision block 70, the sensors 38 determine if the impact was avoided. If the sensors 38 do not detect that the potential impact was avoided, then decision block 70 is repeated. If the impact is avoided, the seatback 26 is returned at block 72 to the initial recline angle $\alpha_1$. If the impact is avoided, the seat cushion 22 is also returned to the initial tilt angle $\Theta_1$ at block 74. After returning to the initial tilt positions $\alpha_1$, $\Theta_1$, the method is repeated at decision block 60.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat assembly comprising:
    a seat bottom adapted to be mounted to a vehicle floor;
    a seatback adapted to be pivotally mounted adjacent to the seat bottom;
    an actuator in cooperation with the seat bottom or the seatback; and
    a controller in electrical communication with the actuator and programmed to:
        receive input indicative of a potential vehicle impact,
        in response to receiving the input indicative of the potential vehicle impact, output a signal to the actuator to tilt the seatback, or to tilt the seat bottom, and
        output a signal to the actuator to tilt the seat bottom upward in response to receiving the input indicative of the potential vehicle impact.

2. The vehicle seat assembly of claim 1 wherein the controller is further programmed to output a signal to the actuator to tilt the seatback rearward in response to receiving the input indicative of the potential vehicle impact.

3. A vehicle seat assembly comprising:
    a seat bottom adapted to be mounted to a vehicle floor;
    a seatback adapted to be pivotally mounted adjacent to the seat bottom;
    an actuator in cooperation with the seat bottom or the seatback; and
    a controller in electrical communication with the actuator and programmed to:
        receive input indicative of a potential vehicle impact,
        in response to receiving the input indicative of the potential vehicle impact, output a signal to the actuator to tilt the seatback, or to tilt the seat bottom,
        output a signal to the actuator to tilt the seatback rearward in response to receiving the input indicative of the potential vehicle impact, and
        output a signal to the actuator to tilt the seatback rearward by approximately nine degrees in response to receiving the input indicative of the potential vehicle impact.

4. The vehicle seat assembly of claim 3 wherein the controller is further programmed to output a signal to the actuator to tilt the seat bottom upward in response to receiving the input indicative of the potential vehicle impact.

5. The vehicle seat assembly of claim 1 wherein the controller is further programmed to output a signal to the actuator to tilt the seat bottom upward by approximately ten degrees in response to receiving the input indicative of the potential vehicle impact.

6. A vehicle seat assembly comprising:
    a seat bottom adapted to be mounted to a vehicle floor;
    a seatback adapted to be pivotally mounted adjacent to the seat bottom;
    an actuator in cooperation with the seat bottom or the seatback; and
    a controller in electrical communication with the actuator and programmed to:
        receive input indicative of a potential vehicle impact,
        in response to receiving the input indicative of the potential vehicle impact, output a signal to the actuator to tilt the seatback, or to tilt the seat bottom, receive input indicative of an avoided vehicle impact, and output a signal to the actuator to return the seat bottom or the seatback to a previous seating position in response to receipt of the input indicative of the avoided vehicle impact.

7. A vehicle seat assembly comprising:
a seat bottom adapted to be mounted to a vehicle floor;
a seatback adapted to be pivotally mounted adjacent to the seat bottom;
an actuator in cooperation with the seat bottom or the seatback;
a second actuator in cooperation with the seat bottom and the vehicle floor to adjust a position of the seat bottom in a fore and aft direction, or in cooperation with a foot pedal to adjust the foot pedal; and
a controller in electrical communication with the actuator and the second actuator, and programmed to:
receive input indicative of a potential vehicle impact,
in response to receiving the input indicative of the potential vehicle impact, output a signal to the actuator to tilt the seatback, or to tilt the seat bottom,
receive input indicative of a change in contact of the foot pedal, and
output a signal to the second actuator to move the seat bottom forward or to move the foot pedal.

8. A land vehicle comprising:
a vehicle floor;
at least one impact sensor;
a vehicle controller in communication with the land vehicle to control travel of the land vehicle, and in communication with the at least one impact sensor to output a signal indicative of a potential vehicle impact; and
at least one seat assembly according to claim 1 mounted to the vehicle floor, wherein the seat assembly controller is in communication with the vehicle controller.

9. The vehicle seat assembly of claim 1 wherein the controller further comprises a computer-program product embodied in a non-transitory computer readable medium that is programmed to automatically adjust the vehicle seat assembly, the computer-program product comprising instructions to:
receive the input indicative of the potential vehicle impact; and
output the signal to the actuator in cooperation with the seat bottom or the seatback of the seat assembly to tilt the seatback or to tilt the seat bottom in response to receiving the input indicative of the potential vehicle impact.

10. The vehicle seat assembly of claim 9 wherein the computer-program product further comprises instructions to output a signal to the actuator to tilt the seatback rearward in response to receiving the input indicative of the potential vehicle impact.

11. The vehicle seat assembly of claim 10 wherein the computer-program product further comprises instructions to output a signal to the actuator to tilt the seatback rearward by approximately nine degrees in response to receiving the input indicative of the potential vehicle impact.

12. The vehicle seat assembly of claim 10 wherein the computer-program product further comprises instructions to output the signal to the actuator to tilt the seat bottom upward in response to receiving the input indicative of the potential vehicle impact.

13. The vehicle seat assembly of claim 9 wherein the computer-program product further comprises instructions to output the signal to the actuator to tilt the seat bottom upward in response to receiving the input indicative of the potential vehicle impact.

14. The vehicle seat assembly of claim 13 wherein the computer-program product further comprises instructions to output a signal to the actuator to tilt the seat bottom upward by approximately ten degrees in response to receiving the input indicative of the potential vehicle impact.

15. The vehicle seat assembly of claim 9 wherein the computer-program product further comprises instructions to:
receive input indicative of an avoided vehicle impact; and
output a signal to the actuator to return the seat bottom or the seatback to a previous seating position in response to receipt of the input indicative of the avoided vehicle impact.

16. The vehicle seat assembly of claim 9 wherein the computer-program product further comprises instructions to:
receive input indicative of a change in contact of a foot pedal; and
output a signal to a second actuator to move the seat bottom forward or to move the foot pedal.

17. The vehicle seat assembly of claim 1
wherein the actuator is further defined as a first actuator in cooperation with the seatback;
wherein the vehicle seat assembly further comprises a second actuator in cooperation with the seat bottom; and
wherein the controller is in electrical communication with the first actuator and the second actuator, and programmed to:
in response to receiving the input indicative of the potential vehicle impact, output a signal to the first actuator to tilt the seatback rearward by approximately nine degrees,
in response to receiving the input indicative of the potential vehicle impact, output a signal to the second actuator to tilt the seat bottom upward by approximately ten degrees,
receive input indicative of an avoided vehicle impact,
output a signal to the first actuator to return the seatback to a previous seating position in response to receipt of the input indicative of the avoided vehicle impact, and
output a signal to the second actuator to return the seat bottom to the previous seating position in response to receipt of the input indicative of the avoided vehicle impact.

18. The vehicle seat assembly of claim 17 further comprising a third actuator in cooperation with a foot pedal to adjust the foot pedal; and
wherein the controller is further programmed to:
receive input indicative of a change in contact of a foot pedal, and
output a signal to the second actuator to move the seat bottom forward or to the third actuator to move the foot pedal.

19. A land vehicle comprising:
a vehicle floor;
at least one impact sensor;
a vehicle controller in communication with the land vehicle to control travel of the land vehicle, and in communication with the at least one impact sensor to output a signal indicative of a potential vehicle impact; and at least one seat assembly according to claim 17 mounted to the vehicle floor, wherein the seat assembly controller is in communication with the vehicle controller.

\* \* \* \* \*